Aug. 1, 1939.  I. L. GARTLAND  2,167,884
APPARATUS FOR DETERMINING THE PRINTING TIME FOR PHOTOGRAPHIC NEGATIVES
Filed July 7, 1937
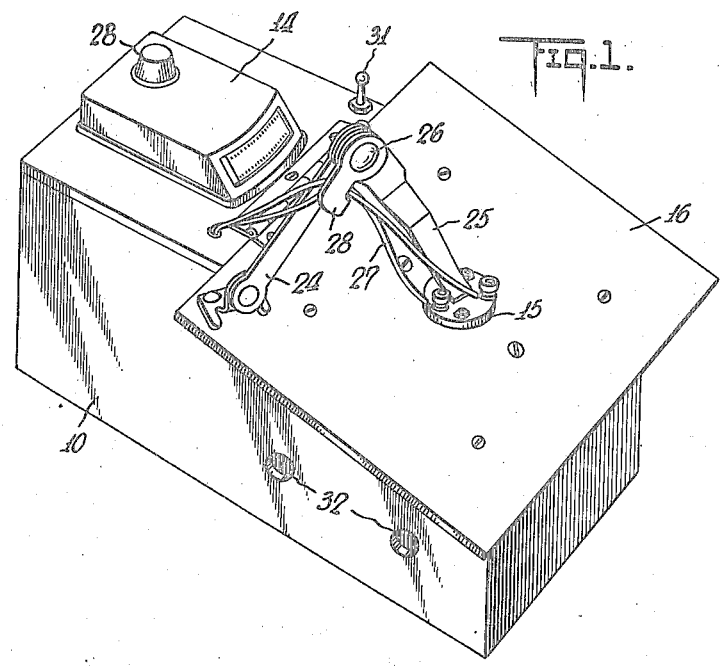
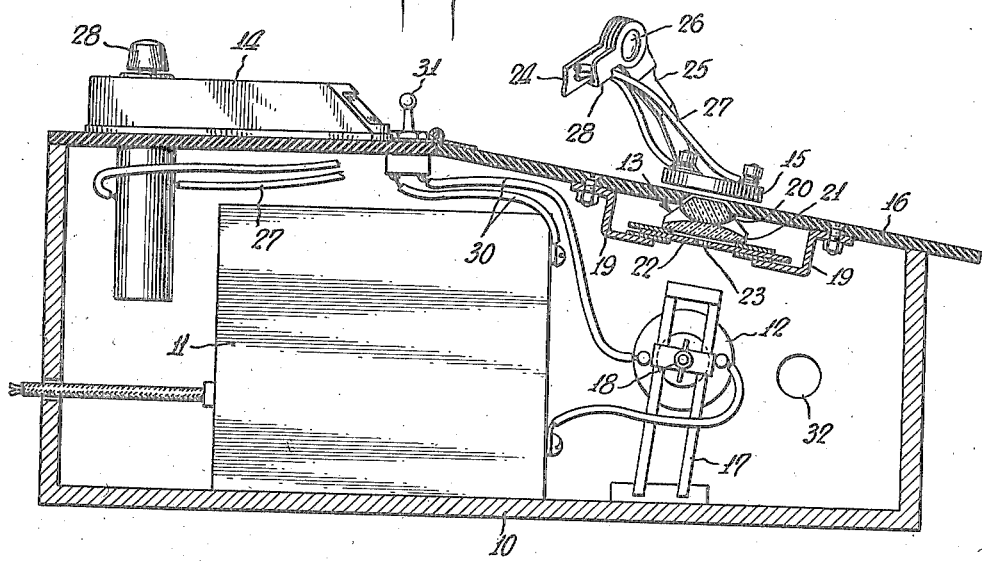
INVENTOR
*Ignatius L. Gartland*
BY
*Dean Fairbank & Hirsch*
ATTORNEYS Patented Aug. 1, 1939

2,167,884

UNITED STATES PATENT OFFICE 2,167,884

APPARATUS FOR DETERMINING THE PRINTING TIME FOR PHOTOGRAPHIC NEGATIVES

Ignatius L. Gartland, Scarsdale, N. Y., assignor to Color Laboratories, Inc., New York, N. Y., a corporation of Pennsylvania Application July 7, 1937, Serial No. 152,332

2 Claims. (Cl. 88—14)

Merely as one example of an art in which my invention may be employed, I may refer to color photography in which the final colored print is made by the use of a plurality of negatives taken by exposure through different color screens. In a common and well known process, three negatives are prepared, one with a red screen, one with a yellow screen and the other with a blue screen. The positive is made by the use of all three negatives, but in order to obtain the proper relative tone values, the printing time from the negatives should be varied in accordance with the average density of the negatives as otherwise some color will be over or under emphasized in the final print. By means of my invention, I am able to quickly and accurately determine the proper printing time for each negative so that the final print will have the proper relative tone values and color intensities.

As one important feature of my invention, I provide a simple apparatus by means of which the average density, light transmission efficiency or opacity of a negative may be determined. Having made such determinations, I am able by means of my improved process to accurately and quickly determine the proper printing time for the negatives.

In the accompanying drawing, I have illustrated an apparatus embodying my invention and which may be employed for carrying out my improved process. In this drawing, Fig. 1 is a perspective view of the apparatus, and Fig. 2 is a central longitudinal vertical section.

The apparatus includes five main or essential parts, namely, a support for a negative, a source of light, a lens assembly or condenser for delivering a very small pencil of light through the negative, a selenium cell for receiving the transmitted light and a galvanometer or other current measuring instrument actuated by the current from the selenium cell. These various parts of the apparatus may vary greatly in detail and as to some of them may vary in relative positioning. In the construction illustrated, merely as one embodiment of the invention, there is employed a casing 10 serving to house a transformer 11, an electric light 12 and a lens assembly or condenser 13. Mounted on the casing are a galvanometer 14 and a selenium cell 15. The transformer is needed only in case the source of current be of high voltage, such for instance as 110 volts, and a low voltage current is required for the source of light. Instead of the transformer, there might be employed a six or eight volts battery in case that voltage be the one employed for the electric light. The battery or the transformer, whichever be used, need not be housed within the casing, but may be in any convenient position, although such housing is preferable to make the entire apparatus a compact portable unit. A portion of the top wall of the casing is in the form of a cover 16 which may be of Bakelite or any other suitable material, and may be hinged so as to give ready access to the parts within the casing.

The cover 16 serves on its upper surface as a support for the negative to be measured, and on its under surface as a support for the lens assembly or condenser which delivers the pencil of light upwardly through the negative.

In the form illustrated, the electric light 12 is carried upon a standard, bracket or other support 17 on the bottom or other stationary wall of the casing, and is adjustable on said support, for instance by a nut 18, in a direction at right angles to the plane of the cover 16 to focus the light on or close to the negative. The condenser is mounted in a bracket 19 secured to the under side of the hinged top wall section 16, and includes a plano-convex lens 20 and a double convex lens 21, and may be of what is commonly known as the Abbe type. Beneath the lenses there is an apertured plate 22 having a small aperture 23 therein. I have found that an aperture of approximately $\frac{3}{32}$nds of an inch in diameter is satisfactory. By proper designing, proportioning and positioning of the lens assembly or condenser, the electric light and the apertured plate, a very small pencil of light, approximately one millimeter in diameter, may be directed onto the under surface of the negative lying on the support 16. To bring the condenser close to the negative so that the negative will lie very close to the focal center of the light, the support 16 may have an aperture approximately the size of the upper surface of the upper lens, and the latter may extend up into this aperture so that its top surface is only slightly below the surface of the negative support 16. As the condenser is carried by the cover, the raising or lowering of the latter does not disturb the relationship of the condenser to the negative.

If one always employs a light having a small intense filament of a fixed candle power, for instance 50, and a constant voltage current, no adjustments need to be made in the position of the light after its position has once been accurately determined, and the apertured plate 22 may be a fixed part of the apparatus. The plate is preferably removable so that it may be replaced by another having a different sized aperture, and the light is preferably vertically adjustable so that the proper operating conditions may be obtained in case of variations in the intensity of the light due to changes in voltage, the use of a different lamp or other causes.

The selenium cell 15, which may be about one-half inch in diameter, is so mounted that it may be readily lifted to permit the insertion of the negative therebeneath and the lateral movement of the negative to the proper or desired position in respect to the pencil of light. The cell is then placed on top of the negative and directly over the pencil of light, but preferably so that the light does not strike the center of the cell. It is important that in operation the selenium cell always occupy the same position in respect to the light and lens assembly for every negative, and therefore the cell is connected to the support 16 by suitable means which insures the return of the cell always to the same position. Merely as an example of such a cell mounting, I have shown an arm 24 rigidly secured in fixed but adjustable position on the negative support 16. The upper end of this arm 24 is pivoted to a second arm 25 secured to the casing of the cell 15. By swinging the arm 25 about the pivot pin 26 connecting the two arms, the cell may be raised or lowered as desired. The wires 27 leading from the cell to the galvanometer may be supported by a bracket 28 on the pivot pin 26 so that they will be held above and out of contact with the negative.

The galvanometer 14 is mounted on the stationary part of the top wall of the casing 10 and may have its magnet and the coil connected to wires 27, disposed within the casing. The galvanometer may be of any suitable type and so calibrated that its minimum and maximum readings will correspond to the thinnest and densest portions of any negative which may be used and with the particular light and cell which is employed. The needle of the galvanometer may be set at zero by an adjusting knob. It may be a D'Arsonval galvanometer with calibrations of from 0 to 60. The wires 30 connecting the transformer and the light may have a switch 31. The casing may have ventilating openings 32 to dissipate the heat of the lamp.

In the use of my improved apparatus the cell 15 may be raised and a negative placed on the support 16. The pencil of light through the condenser will show as a very small spot on the negative and the negative may be moved around to bring it to the position where its densest part is directly in the path of the pencil of light. The selenium cell is then moved down directly onto the negative and over the pencil of light. The light passing through the negative will energize the cell to deflect the galvanometer needle, and the position of the needle is read on the scale. The cell is then raised, the negative is again moved until the thinnest portion having maximum light transmission is brought directly over the pencil of light, the cell is lowered and the galvanometer is again read. The average of these two galvanometer readings will give the average density or light transmission efficiency of the negative.

In color photography work the operator should be careful to select the portions on the negative which represent pure white and the deepest black or darkest shadow in order that the density of these portions will not be materially affected by the presence or absence of any particular color in the areas where the measurement is made.

My improved apparatus may be employed in carrying out my process in color photography as follows:

If there be three negatives taken by the use of red, yellow and blue color screens, these will be of different average densities, depending in part upon the time of exposure or the time of development, or both, but primarily by reason of the different intensities in the different colors of the subject photographed. To obtain a proper print it is necessary to give a different printing time for each of the negatives if they do differ in average intensity. By the term "printing time" I mean either the time during which the exposure of the print is made through the negative or the time for the development of the print after the exposure, or both. Having determined the average density of each of the three negatives, a print is made from one of the negatives, and if necessary, a plurality of prints with different times of exposure or development in order to get what is decided to be the proper print. The time of exposure and the time of development of that selected print are noted and are used in connection with the galvanometer readings of density to accurately determine the proper printing time for the other negatives. This may be done by using the formula $$T_2 = \frac{D_2 \times T_1}{D_1}$$

in which $D_2$ represents the density of the first negative from which the selected print was made, $T_1$ represents the time of printing of that selected negative, and $D_1$ represents the density of the negative for which the proper printing time $T_2$ is to be determined. Merely as an example, if it is desired to have a uniform development time of 40 seconds and the densities of the three negatives are 14 for the blue, 17 for the red and 11 for the yellow, and the proper print has been obtained from the blue negative with an exposure time of 15 seconds, then, by applying the formula above given the exposure time for the red negative would be about 12 seconds, that is, $$\frac{14 \times 15}{17}$$

and the exposure time for the yellow negative will be 19 plus seconds, that is, $$\frac{14 \times 15}{11}$$

It is preferable to vary the exposure time in the printing, and in accordance with the predetermined density instead of varying the development time, but it will be evident that the exposure time in all three negatives might be the same instead of the development time being the same, and in that case, the development time would vary and would be used in the formula.

As another embodiment of my process there may be a large number of negatives which are to be used in making prints to be incorporated in a book, and it is desired to have all of the prints of approximately the same tonal value. All of the negatives may be measured to determine their average density or light transmission, and a print of the desired tonal value made from one of the negatives. Then by using the instrument above described and the formula above referred to, the proper reading time for all of the other negatives may be determined. Various other uses may be made of the apparatus and process.

Having thus described my invention, what I claim as new and desire to secure by Letters Patent is:

1. An apparatus for determining the light transmission of photographic negatives, which includes a casing having the top wall forming a negative support provided with an opening therethrough, a condenser within said casing and registering with said opening, a filament source of light also within said casing, and a plate having a small aperture therein positioned closely adjacent to said condenser, said condenser, light and plate being in fixed relative positions, whereby a small pencil of light of constant size and intensity is projected through the opening in said negative support, and a selenium cell outside of said casing above said negative support, and means connecting the cell and said casing and mounting the cell for movement toward and from the negative support, to permit positioning of any desired portion of the film directly over the pencil of light, and to permit positioning of said cell closely adjacent to the outer surface of the film.

2. An apparatus for determining the light transmission of photographic negatives, including a casing having the top wall thereof serving as a negative support, and having an opening therethrough, a condenser comprising a plano-convex lens and a double convex lens within said opening and with the plane surface of the first mentioned lens substantially flush with the upper surface of said negative support, a plate having a small aperture therein closely adjacent to the under surface of said condenser with the aperture in the axis of light through the condenser, a source of light within said casing below said plate and condenser, whereby a small pencil of light of fixed size and intensity is projected through the opening of said negative support, a selenium cell, means connecting said cell and said casing and mounting the cell for movement away from said support to permit the desired portion of a negative to be positioned on said support in registry with the pencil of light, and for movement toward said casing to a position closely adjacent to the upper surface of the film, and an electric current indicating instrument connected to said selenium cell.

IGNATIUS L. GARTLAND.